(12) United States Patent
Valin et al.

(10) Patent No.: US 9,560,386 B2
(45) Date of Patent: Jan. 31, 2017

(54) PYRAMID VECTOR QUANTIZATION FOR VIDEO CODING

(71) Applicants: Jean-Marc Valin, Montreal (CA); Timothy B. Terriberry, Mountain View, CA (US)

(72) Inventors: Jean-Marc Valin, Montreal (CA); Timothy B. Terriberry, Mountain View, CA (US)

(73) Assignee: Mozilla Corporation, Mountain View, CA (US)

( * ) Notice: Subject to any disclaimer, the term of this patent is extended or adjusted under 35 U.S.C. 154(b) by 333 days.

(21) Appl. No.: 14/187,081

(22) Filed: Feb. 21, 2014

(65) Prior Publication Data
US 2014/0286399 A1 Sep. 25, 2014

Related U.S. Application Data

(60) Provisional application No. 61/767,338, filed on Feb. 21, 2013.

(51) Int. Cl.
*H04N 19/625* (2014.01)
*H04N 19/94* (2014.01)

(52) U.S. Cl.
CPC .................................... *H04N 19/94* (2014.11)

(58) Field of Classification Search
CPC .......................... H04N 19/00812; H04N 19/94
USPC ....................................... 375/240.2; 704/222
See application file for complete search history.

(56) References Cited

U.S. PATENT DOCUMENTS

| | | | | |
|---|---|---|---|---|
| 6,925,119 B2 * | 8/2005 | Bartolucci | ............... | G06T 9/008 375/240.03 |
| 8,160,149 B2 * | 4/2012 | Demos | ................. | H04N 19/597 375/240.16 |
| 8,694,325 B2 * | 4/2014 | Lin | ........................ | G10L 19/002 704/203 |
| 8,838,442 B2 * | 9/2014 | Terriberry | ........... | G10L 19/0212 704/205 |
| 8,874,450 B2 * | 10/2014 | Peng | ..................... | G10L 19/025 704/205 |
| 9,015,052 B2 * | 4/2015 | Lin | ........................ | G10L 19/038 704/500 |
| 2004/0083110 A1 * | 4/2004 | Wang | .................... | G10L 19/005 704/500 |
| 2014/0286399 A1 * | 9/2014 | Valin | ...................... | H04N 19/94 375/240.03 |

OTHER PUBLICATIONS

A Pyramid Vector Quantizer; Fischer; 1986.*
Video Coding Scheme Using DCT pyramid VQ; Alessandro; 1995.*
Scalable image coding using Gaussian pyramid vector quantization with resolution-independent block size; by Cieplinski and Bober.*

(Continued)

*Primary Examiner* — William C Vaughn, Jr.
*Assistant Examiner* — Luis Perez Fuentes
(74) *Attorney, Agent, or Firm* — Dergosits & Noah LLP; Todd A. Noah

(57) ABSTRACT

An apparatus and corresponding method are provided for pyramid vector quantization of video data, including receiving the video data in the frequency domain; and pyramid vector quantizing at least one group of pictures (GOP) from the received video data in accordance with a potentially varying bandwidth, the GOP comprising key frames and predicted frames.

9 Claims, 6 Drawing Sheets

(56) References Cited

OTHER PUBLICATIONS

A Pyramid Vector Quantizer; Fischer 1986.*
Decomposed pyramid vector quantization by using Barness-Wall lattice; Mlhalik; 2001.*
Video Coding Scheme Using DCT-Pyramid Vector Quantization; Alessandro; 1995.*
Scalable image coding using Gaussian pyramid vector quantization with resolutionindependent block size; by Cieplinski and Bober.*
Fang et al., Internet Engineering Task Force (IETF) Request for Comment 6716, MPLS Transport Profile (MPLS-TP) Applicability; Use Cases and Design ISSN 2070-1721; Aug. 2013; 16 pages.

* cited by examiner

PYRAMID VECTOR QUANTIZATION FOR VIDEO CODING

CROSS-REFERENCE TO RELATED APPLICATIONS

This application claims the benefit of U.S. Provisional Patent Application 61/767,338 filed on Feb. 21, 2013 entitled, "PYRAMID VECTOR QUANTIZATION FOR VIDEO CODING", which is incorporated by reference herein in its entirety.

BACKGROUND

Coding systems and methods typically encode a single audio stream and a single associated video stream for streaming from a source to a destination. The combined bandwidth of the audio and video streams is the required channel bandwidth between the source and destination. If this channel bandwidth is reduced due to network congestion, for example, conventional systems have limited means of adequately dealing with the reduction. In general, they may rely on low-pass quantization, which sacrifices energy detail for reduced bandwidth.

Unfortunately, such systems and methods have drawbacks such as blurriness due to loss of energy detail, activity masking overhead, and inefficient representation of coefficients. Embodiments of the present disclosure address these and other issues.

SUMMARY

These and other drawbacks and disadvantages of the prior art are addressed by an apparatus and corresponding method of pyramid vector quantization for video coding.

An exemplary method of pyramid vector quantization for encoding video data includes receiving the video data in a frequency domain; pyramid vector quantizing at least one group of pictures (GOP) from the received video data in accordance with a potentially varying bandwidth, the GOP comprising key frames and predicted frames; and quantizing the key frames before the predicted frames to form at least one stream, the at least one stream having a correspondingly varying number of quantized frequency bands or a correspondingly varying number of quantized data bits.

A further exemplary method includes receiving an input; computing a prediction responsive to the input; computing a reflection plane responsive to the input and prediction; applying the reflection to the input and prediction; computing an angle between the input and prediction; quantizing the angle; and coding the quantized angle. Yet a further exemplary method includes splitting the received frequency-domain video data into at least two frequency bands; and quantizing an upper frequency band more coarsely than a lower frequency band.

An exemplary apparatus for pyramid vector quantization to encode video data includes a processor; and one or more stored sequences of instructions which, when executed by the processor, cause the processor to: receive the video data in a frequency domain; pyramid vector quantize at least one group of pictures from the received video data in accordance with a potentially varying bandwidth, the GOP comprising key frames and predicted frames; and quantize the key frames before the predicted frames to form at least one stream, the at least one stream having a correspondingly varying number of quantized frequency bands or a correspondingly varying number of quantized data bits.

A further exemplary apparatus is provided, wherein the one or more stored sequences of instructions further cause the processor to: receive an input; compute a prediction responsive to the input; compute a reflection plane responsive to the input and prediction; apply the reflection to the input and prediction; compute an angle between the input and prediction; quantize the angle; and code the quantized angle. Yet a further exemplary apparatus is provided, wherein the one or more stored sequences of instructions further cause the processor to: split the received frequency-domain video data into at least two frequency bands; and quantize an upper frequency band more coarsely than a lower frequency band.

An exemplary apparatus for pyramid vector quantization to encode video data is provided, the apparatus including an input terminal; a prediction unit in signal communication with the input terminal; a transform unit in signal communication with the input terminal and the prediction unit; a pyramid vector quantization unit in signal communication with the transform unit; an entropy coding unit in signal communication with the quantization unit; an inverse quantization unit in signal communication with the quantization unit; an inverse transform unit in signal communication with the inverse quantization unit; a reference picture unit in signal communication with the inverse transform unit; a motion estimation unit in signal communication with each of the reference picture unit and the input terminal; and a motion compensation unit in signal communication with each of the reference picture unit and the motion estimation unit, wherein the motion compensation unit is in direct signal communication with the transform unit. Another exemplary apparatus is provided, wherein the pyramid vector quantization unit comprises a band splitter.

An exemplary computer program product is provided, including a non-transitory computer-readable medium having a computer-readable program code embodied therein to be executed by one or more processors, the program code including instructions to: receive video data in the frequency domain; pyramid vector quantize at least one group of pictures from the received video data in accordance with a potentially varying bandwidth, the GOP comprising key frames and predicted frames; and quantize the key frames before the predicted frames to form at least one stream, the at least one stream having a correspondingly varying number of quantized frequency bands or a correspondingly varying number of quantized data bits.

A further exemplary computer program product is provided, wherein the program code includes further instructions to: receive an input; compute a prediction responsive to the input; compute a reflection plane responsive to the input and prediction; apply the reflection to the input and prediction; compute an angle between the input and prediction; quantize the angle; and code the quantized angle. Yet another exemplary computer program product is provided, wherein the program code includes further instructions to: split the received frequency-domain video data into at least two frequency bands; and quantize an upper frequency band more coarsely than a lower frequency band.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches pyramid vector quantization for video coding in accordance with the following exemplary figures, in which.

DETAILED DESCRIPTION OF PREFERRED EMBODIMENTS

The present disclosure defines an apparatus and method enabling pyramid vector quantization for video coding. Pyramid vector quantization has already shown promise in audio coding. For example, it is used in Opus for both the SILK and CELT parts. As applied herein to a video codec such as one from Xiph.Org's Daala Project, for example, potential advantages include the preservation of energy details, even when such details are imperfect, as opposed to blurring; implicit activity masking; and better representation of coefficients. Thus, pyramid vector quantization may be advantageously applied to video coding as taught herein.

The present disclosure describes adapting the Opus RFC 6716 energy conservation principle to video coding based on a pyramid vector quantizer (PVQ). See Internet Engineering Task Force (IETF) Request for Comment 6716, ISSN 2070-1721.

One advantage of conserving energy of the AC coefficients in video coding is preserving textures rather than low-passing them. Also, by introducing a fixed-resolution PVQ-type quantizer, a simple activity masking model is easily gained. One challenge of adapting this scheme to video was that a good prediction exists, namely the reference frame, so code vectors near a point on the PVQ hyper-sphere representing the prediction are more probable, rather than having a more uniform distribution, such as in Opus. Other challenges include the introduction of a quantization matrix and the desire to represent the reference or motion predicted data perfectly by one of the codebook entries. For small (e.g., 4×4) blocks, all of the AC coefficients may be put into a single band.

In gain-shape quantization, vectors are represented as a magnitude multiplied by a unit-norm vector, i.e., as a radius plus a point on a hypersphere. Magnitude is coded separately, and the quantization resolution of the point on the hypersphere is adjusted based on the magnitude. There is a trade-off between the accuracy used to represent the amount of texture versus the accuracy of the exact details. As used herein, the terms "frame" and "picture" may be used interchangeably.

Figure 1:
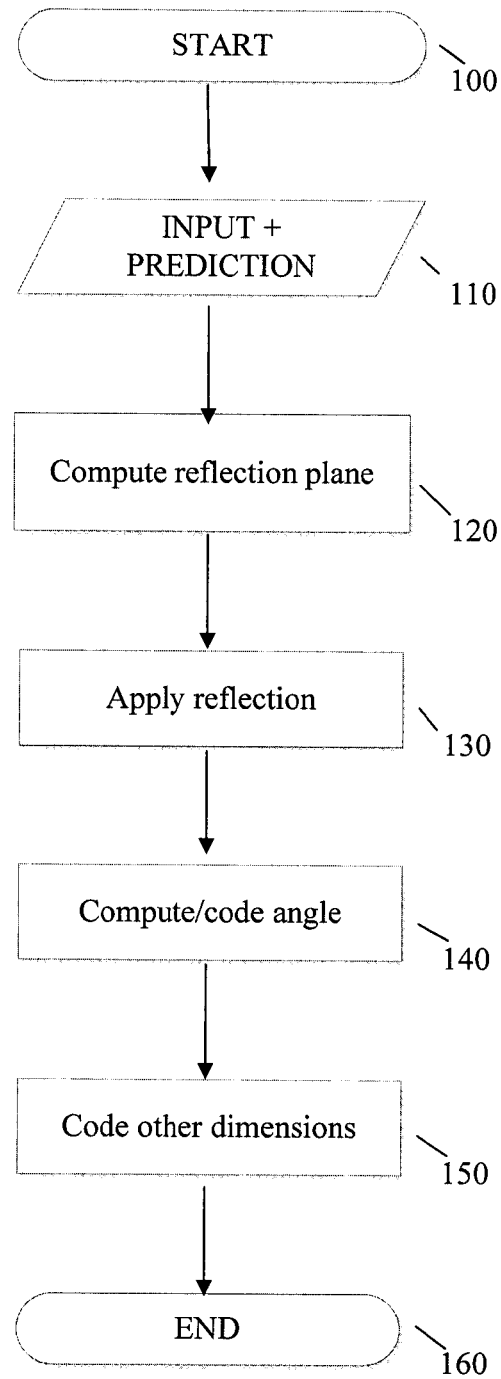
FIG. 1 shows a flow diagram for a method of pyramid vector quantization in accordance with the principles of the present disclosure.

As shown in FIG. 1, a method of pyramid vector quantization is indicated generally by the reference numeral 100. A start block 100 passes control to an input and prediction block 110, which, in turn, passes control to a function block 120 to compute a reflection plane. The block 120 passes control to a function block 130, to apply the reflection, and, in turn, to a function block 140. The function block 140 computes, quantizes, and codes an angle, and passes control to a function block 150. The block 150 codes the other dimensions, and passes control to an end block 160.

Figure 2:
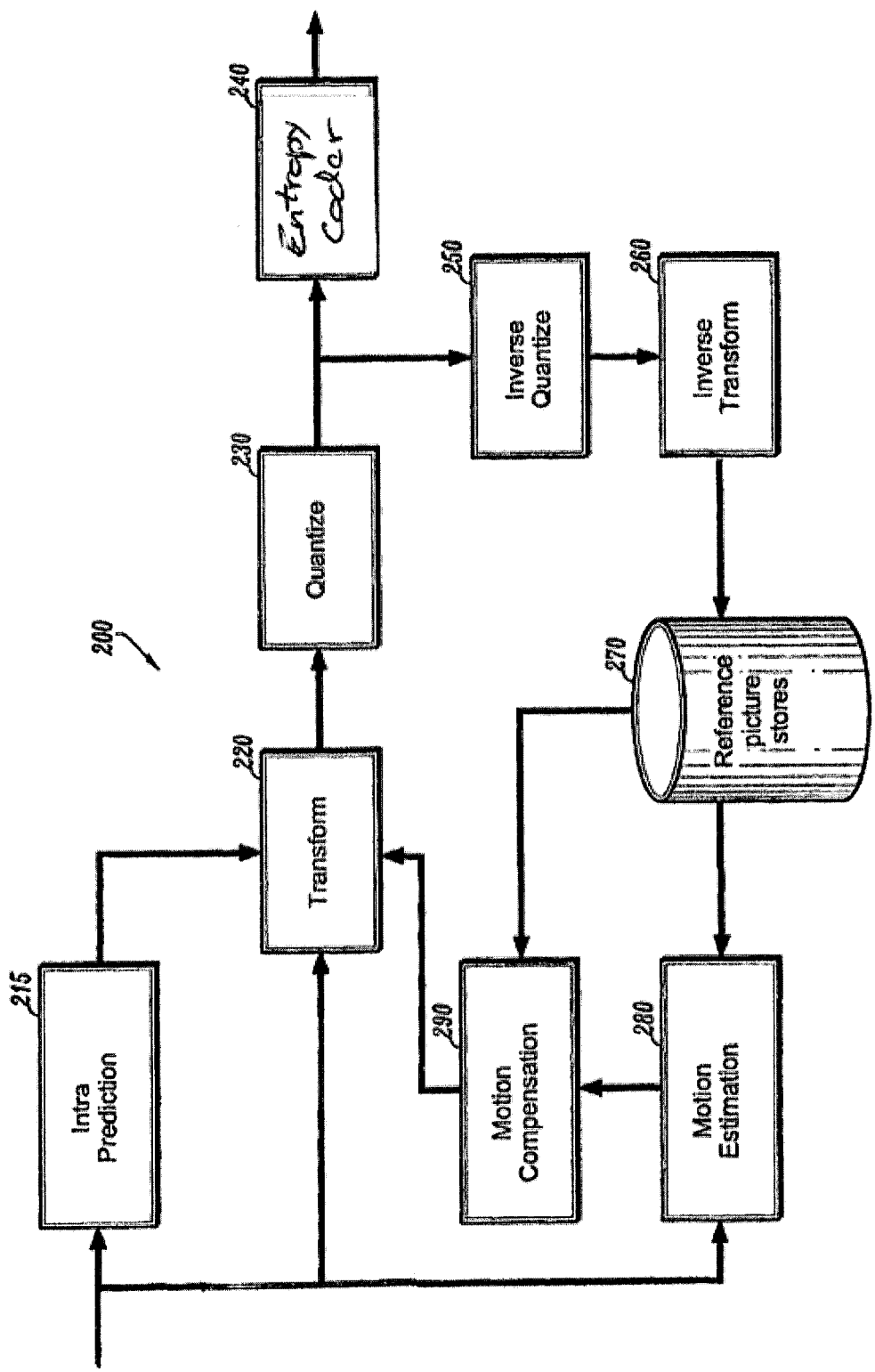
FIG. 2 shows a system diagram for a video encoder with pyramid vector quantizer (PVQ) in accordance with the principles of the present disclosure.

Turning to FIG. 2, a video encoder is indicated generally by the reference numeral 200. An input to the encoder 200 is connected in signal communication with a (possibly overlapped) block transform function 220.

The input to the encoder 200 is further connected in signal communication with an intra prediction block 215 for key frames and intra-predicted blocks in predicted frames, which has its output connected to an input of a block transform unit 220. The transform 220 is connected in signal communication with a pyramid vector quantizer (PVQ) 230. In an exemplary embodiment, the transform unit 220 implements an overlapped transform function. It shall be understood that a separate quantizer parameter determination unit for rate control may feed the quantizer 230 in alternate embodiments, with the signaling between the units indicating which quantizer parameter to use. The output of the quantizer 230 is connected in signal communication with an entropy coder 240, where the output of the entropy coder 240 is an externally available output of the encoder 200.

The output of the quantizer 230 is further connected in signal communication with an inverse quantizer 250. The inverse quantizer 250 is connected in signal communication with an inverse block transform function 260, which, in turn, is connected in signal communication with a reference picture store 270. A first output of the reference picture store 270 is connected in signal communication with a first input of a motion estimator 280 for multiple reference pictures. The input to the encoder 200 is further connected in signal communication with a second input of the motion estimator 280.

The output of the motion estimator 280 is connected in signal communication with a first input of a motion compensator 290. A second output of the reference picture store 270 is connected in signal communication with a second input of the motion compensator 290. The output of the motion compensator 290 is connected in direct signal communication with third input of the transform unit 220.

Referring to Table A in Appendix I, <Equation 1> defines a method for pyramid vector quantization. Here, K unit pulses are placed in N dimensions, where N is up to 1024 dimensions in this exemplary embodiment. The result is normalized to the unit norm, L2.

Figure 3:
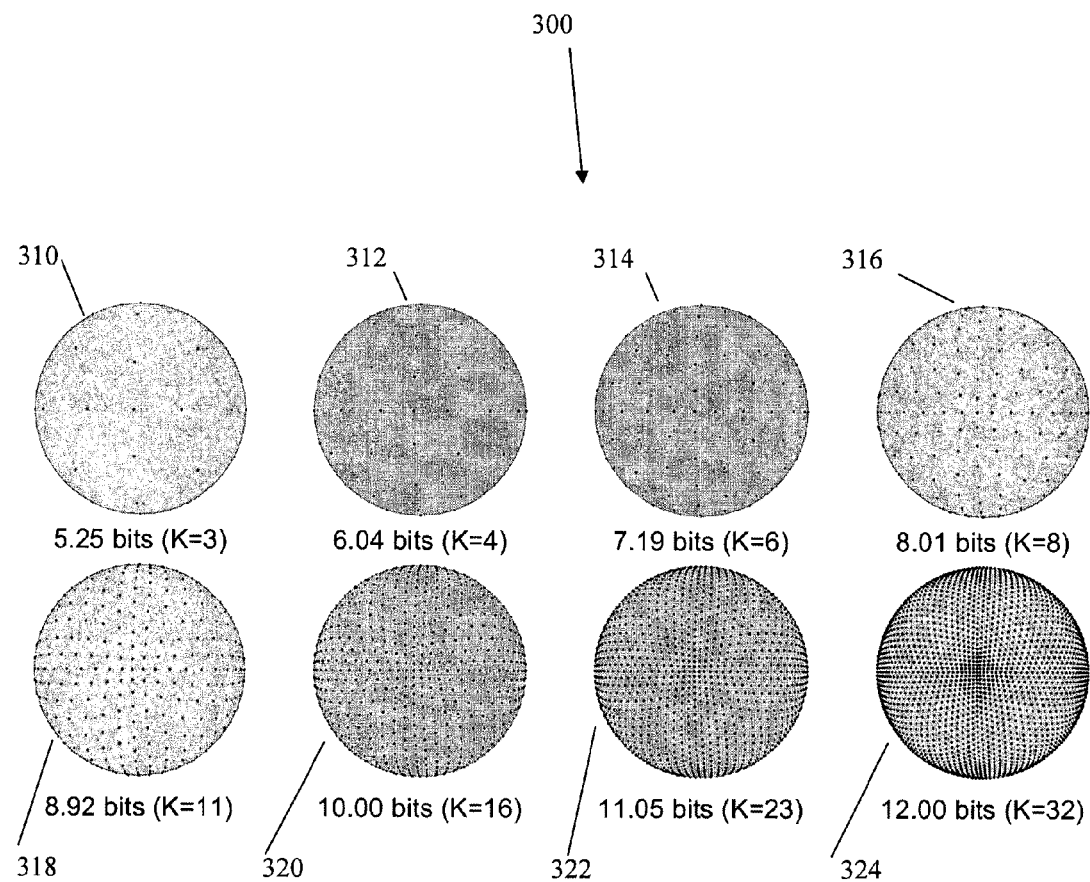
FIG. 3 shows a comparative diagram of a codebook for N=3 and different K in accordance with the principles of the present disclosure.

Turning now to FIG. 3, a comparative plot for pyramid vector quantization is indicated generally by the reference numeral 300. Here, sub-plot 310 shows 5.25 bits for K=3, sub-plot 312 shows 6.04 bits for K=4, sub-plot 314 shows 7.19 bits for K=6, sub-plot 316 shows 8.01 bits for K=8, sub-plot 318 shows 8.92 bits for K=11, sub-plot 320 shows 10.00 bits for K=16, sub-plot 322 shows 11.05 bits for K=23, and sub-plot 324 shows 12.00 bits for K=32.

Figure 4:
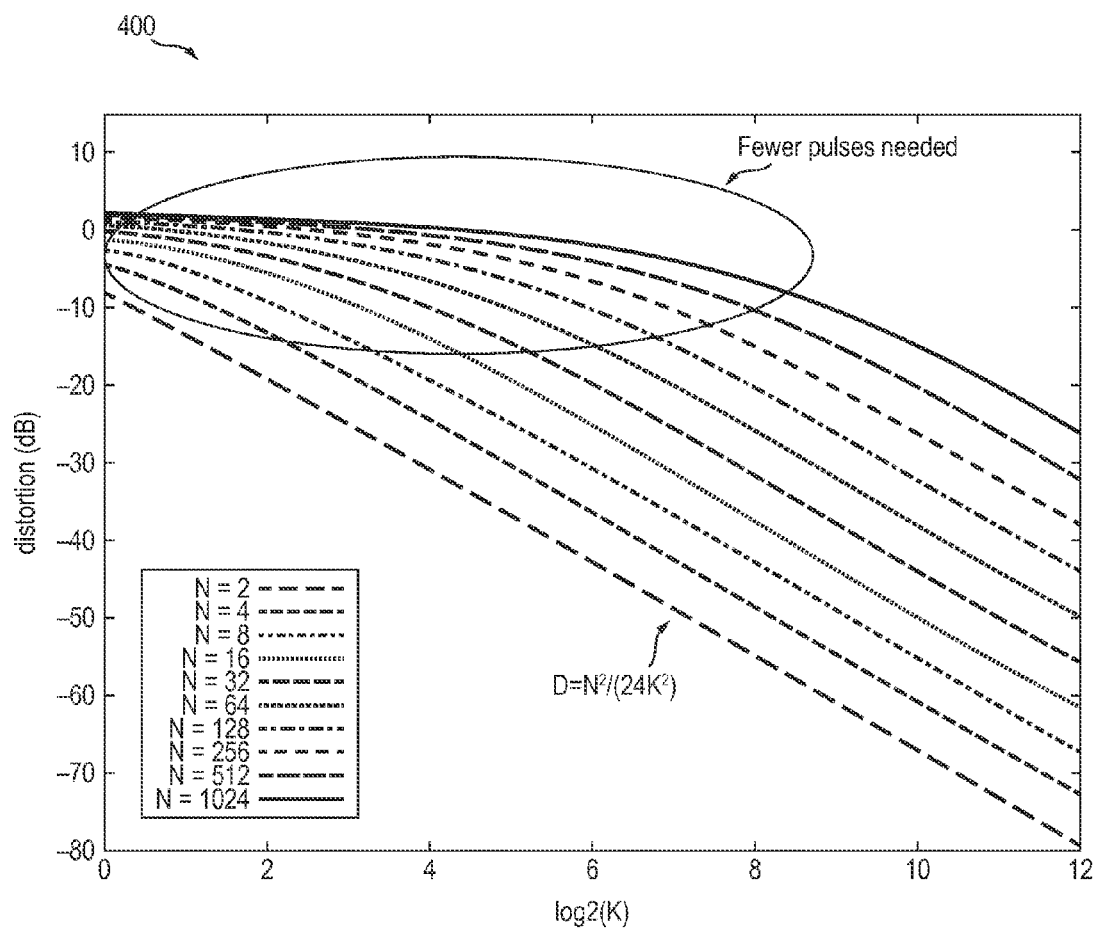
FIG. 4 shows a graphical diagram of distortion versus N and K in accordance with the principles of the present disclosure.

As shown in FIG. 4, a graph of distortion (dB) versus K (log 2 K) is generally indicated by the reference numeral 400, where comparative plots for $D=N^2/(24K^2)$ are indicated, beginning from the bottom, with N=2, N=4, N=8, N=16, N=32, N=64, N=128, N=256, N=512, and N=1024, respectively. Fewer pulses are needed in the upper area 410.

In pyramid vector quantization for video coding, unlike CELT, it is desirable to predict the vectors. The first step is to perform PVQ on the residual loses energy preservation. The second step is to apply prediction in the normalized vector by using the Householder reflection to align prediction with one axis, and encoding the magnitude of the residual as an angle.

Figure 5:
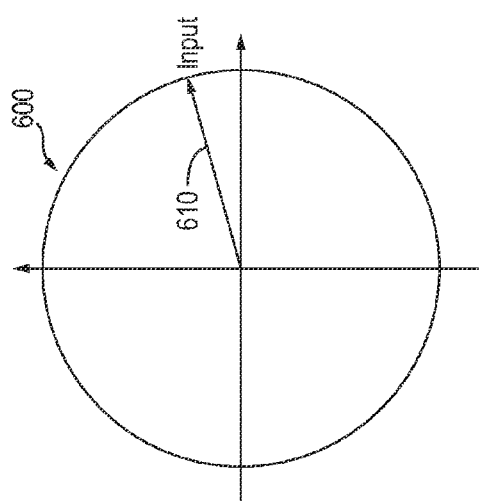
FIG. 5 shows a 2-dimensional (2D) projection diagram for input in accordance with the principles of the present disclosure.

Turning to FIG. 5, a 2-dimensional (2D) projection diagram for input is indicated generally by the reference numeral 600. The input 610 is as shown.

Figure 6:
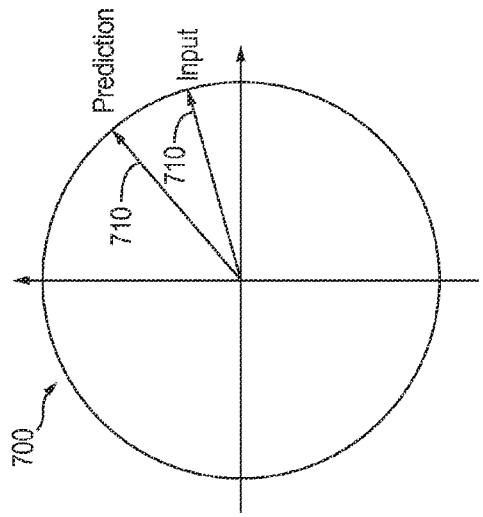
FIG. 6 shows a 2D projection diagram for input plus prediction in accordance with the principles of the present disclosure.

Turning now to FIG. 6, a 2D projection diagram for input and prediction is indicated generally by the reference numeral 700. The input 710 and prediction 712 are as shown.

Figure 7:
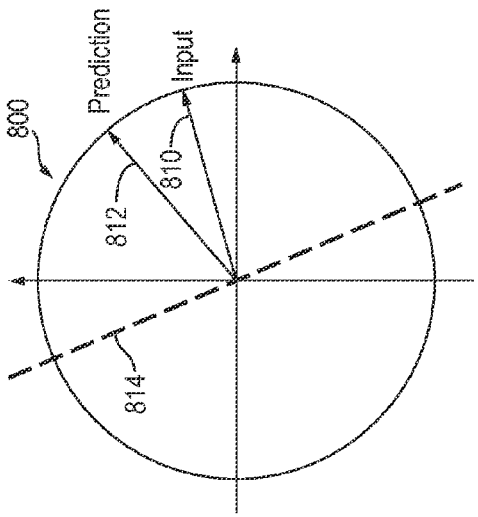
FIG. 7 shows a 2D projection diagram for input plus prediction and computed reflection plane in accordance with the principles of the present disclosure.

As shown in FIG. 7, a 2D projection diagram for input plus prediction and computed reflection plane is indicated generally by the reference numeral 800. The input 810, prediction 812, and computed reflection plane 814 are as shown.

Figure 8:
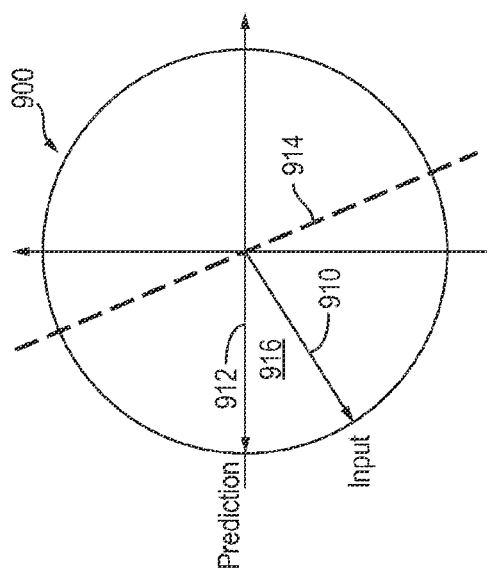
FIG. 8 shows a 2D projection diagram for input plus prediction, computed reflection plane, and applied reflection in accordance with the principles of the present disclosure.

Turning to FIG. 8, a 2D projection diagram for input plus prediction, computed reflection plane, and applied reflection is indicated generally by the reference numeral 900. The input 910, prediction 912, computed reflection plane 914 and applied reflection 916 are as shown.

Figure 9:
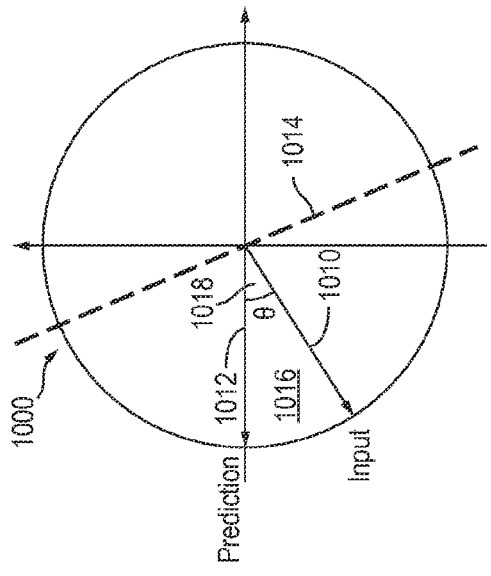
FIG. 9 shows a 2D projection diagram for input plus prediction, computed reflection plane, applied reflection, and computed code angle in accordance with the principles of the present disclosure.

Turning now to FIG. 9, a 2D projection diagram for input plus prediction, computed reflection plane, applied reflection, and computed code angle is indicated generally by the reference numeral 1000. The input 1010, prediction 1012, computed reflection plane 1014, applied reflection 1016 and computed code angle 1018 are as shown.

Figure 10:
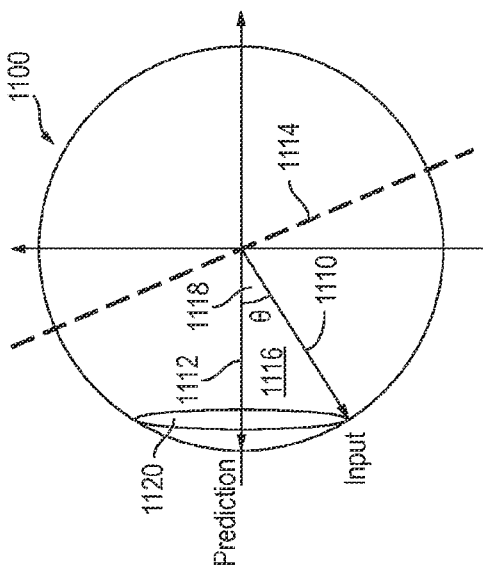
FIG. 10 shows a 2D projection diagram for input plus prediction, computed reflection plane, applied reflection, computed code angle, and coded other dimensions in accordance with the principles of the present disclosure.

As shown in FIG. 10, a 2D projection diagram for input plus prediction, computed reflection plane, applied reflection, computed code angle, and coded other dimensions is indicated generally by the reference numeral 1100. The input 1110, prediction 1112, computed reflection plane 1114, applied reflection 1116, computed code angle 1118 and coded other dimensions 1120 are as shown.

Activity masking is advantageous because artefacts are easier to detect on flat areas than on textured areas. Thus, the gain and unit-norm vector are preferably coded with a resolution that depends on the gain or texture. This can be achieved by using a companded version of the gain, i.e., quantizing with a non-uniform resolution. The code-companded gain $g_c=g^\gamma$, with $\gamma=1/(1+2a)$, so implicit activity masking is built into the bit stream.

For gain-shape coding and activity masking, a main theme behind the video coding scheme is to code groups of DCT coefficient as a scalar gain and a unit-norm "shape" vector. A block's AC coefficients may all be part of the same group, or may be divided by frequency, such as by octave, for example, and/or by directionality, such as horizontal versus vertical, for example.

It is desirable for a single quality parameter to control the resolution of both the gain and the shape. Preferably, that quality parameter should also take into account activity masking, that is, the fact that the eye is less sensitive to regions of an image that have more details. According to Jason Garrett-Glaser, the perceptual analysis in the x264 encoder uses a resolution proportional to the variance of the AC coefficients raised to the power a, with a=0.173.

For gain-shape quantization, this is equivalent to using the quantization steps of <Equation 2> contained in Appendix I, Table A, where g is the gain, gamma is the gain quantization index, and Q_g is the gain resolution and main quality parameter.

An important aspect of the present disclosure is the use of prediction. In the case of the gain, there is usually a significant correlation with the gain of neighbouring blocks. One way to predict the gain of a block is to compute the gain of the coefficients obtained through intra or inter prediction. Another way is to use the encoded gain of the neighboring blocks to explicitly predict the gain of the current block.

To use the Householder reflection, vector x_d denotes the pre-normalization DCT band to be coded in the current block and vector r_d denotes the corresponding reference based on intra prediction or motion compensation. The encoder computes and encodes the "band gain" $g=\mathrm{sqrt}(x\_d^T x\_d)$. The normalized band is computed as <Equation 3> with the normalized reference r similarly computed based on r_d. The encoder then finds the position, m, and sign, s, of the maximum value in r according to <Equation 4>, and computes the Householder reflection that reflects r to −s e_m. The reflection vector is given by <Equation 5>. The encoder reflects the normalized band to find the unit-norm vector of <Equation 6>. The closer the current band is to the reference band, the closer z is from −s e_m. This can be represented either as an angle, or as a coordinate on a projected pyramid.

Angle-Based Encoding

Assuming no quantization, the similarity can be represented by the angle theta of <Equation 7>. If theta is quantized and transmitted to the decoder, then z can be reconstructed as z of <Equation 8>, where z_r is a unit vector based on z that excludes dimension m.

The vector z_r can be quantized using PVQ. Let y be a vector of integers that satisfies <Equation 9>, with K determined in advance, then the PVQ search finds the vector y that maximizes $y^T z\_r/(y^T y)$. The quantized version of z_r is <Equation 10>.

If it is assumed that MSE is a good criterion for optimizing the resolution, then the angle quantization resolution should be approximately as shown in <Equation 11>. To derive the optimal K one needs to consider the cosine distance between adjacent code vectors y_1 and y_2 for two cases: K<N and K>N.

For K<N, the worst resolution occurs when no value in y is larger than one. In that case, the two closest code vectors have a cosine distance of <Equation 12>. By approximating $\cos(\tau)$ as $1-\tau^2$, we get <Equation 13>.

For K>N, the worst resolution happens when all values are equal to K/N in y_1, and y_2 differs by one pulse. In that case, see <Equation 14>, which gives the approximation of <Equation 15>.

By combining the two cases, we have <Equation 16>. To achieve uniform resolution in all dimensions, use tau of <Equation 17>. The value of K does not need to be coded because all the variables it depends on are known to the decoder. However, because Q_theta depends on the gain, this can lead to unacceptable loss propagation behavior in the case where inter prediction is used for the gain.

This issue can be worked around by assuming sin(theta) is approximately equal to theta. With this approximation, then tau is equal to the inverse of the theta quantization index, with no dependency on the gain.

Alternatively, instead of quantizing theta, one may quantize sin(theta) which also removes the dependency on the gain. In the general case, we quantize f(theta) and then assume sin(theta) is approximately equal to f(theta). A possible choice of f(theta) is a quadratic function of the form shown in <Equation 18>, where a1 and a2 are two constants satisfying the constraint of f(pi/2)=pi/2. The value of f(theta) can also be predicted, but in cases where error propagation is a concern, it should only be predicted from information coded in the current frame.

Pyramid-Based Encoding

Instead of explicitly encoding an angle, it is also possible to apply PVQ directly on z. In that case, the angle is replaced by v=K+s*y[m], with 0<=v<=2K, with smaller values more likely if the predictor is good. Based on calculations similar to those for the angle-based encoding, the value of K is set to <Equation 19>, where c1 and c2 are empirical constants. As is the case for angle-based encoding, K does not need to be coded.

However, if the gain parameter gamma is predicted from a different frame, then this would lead to unacceptable error propagation behavior. To reduce the error propagation, instead of coding v, we code v'=K−|y[m]|, along with the sign of s*y[m]. In this way, any error in the gain will lead to the wrong value of K, but will not cause a desynchronization of the entropy coder as would happen when decoding the wrong number of symbols.

Bi-Prediction

This scheme can be used for bi-prediction by introducing a second theta parameter. For the case of two (normalized) reference frames r1 and r2, we introduce s1=(r1+r2)/2 and s2=(r1−r2)/2. We start by using s1 as a reference, apply the Householder reflection to both x and s2, and evaluate theta1. From there, we derive a second Householder reflection from the reflected version of s2 and apply it to z. The result is that the theta1 parameter controls how the current image compares to the two reference images. It is also possible to use this in the case of fades, using two references that are before the frame being encoded.

Alternate embodiments may vary how the data is split into bands, minimize or eliminate wasting bits on still video, use a different quantization matrix, take advantage of correlation and prediction in gain and angle, or provide rate-distortion optimization (RDO) such as by a fast RDO PVQ search.

In other alternate embodiments, rate control may be used to provide data streams for input to a selector. Rate control involves the process of allocating bits for a group of pictures, a picture, a slice and/or a macroblock. Preferred embodiments of the present disclosure may assume that the length of a sequence is unknown. The group of pictures (GOP) includes the pictures between two adjacent intra-coded pictures, as well as the first intra-coded picture.

Preferred embodiments of the present disclosure can meet bit-rate and/or storage requirements, avoid buffer overflow and underflow, encode good picture quality with a desired number of bits, limit picture quality variance between pictures, and encode good sequence quality at a desired bit-rate.

A bit limit may be used for a stream sequence, a GOP, a picture, a slice, a block, and/or a band. The bit limit may assume, for example, that the total bits and/or length of a sequence is unknown, that a GOP means frames between two adjacent key frames, and that the initial frame bit limit ratio for key frames and predicted frames is pre-set. The ratio may be updated after each GOP is encoded. For example, the initial bit limit ratio for a succeeding GOP may be initialized to the bit limit ratio resulting from the previous GOP. The bits may correspond to the maximum number of GOP bits, the average GOP bits, the previous GOP bits, and the total available bits.

An estimate of encoding complexity may be obtained for a key frame or intra block as the sum of absolute difference, for a predicted frame as the sum of absolute prediction difference, for a block or band as the sum of absolute difference.

An encoder buffer may be modeled by a buffer size equal to the average bit-rate for 2-GOP bits. If the encoder buffer is in underflow, zeros may be appended. If the frame to be encoded might cause the encoder buffer to underflow, the frame size may be increased. If the frame to be encoded might cause the encoder buffer to overflow, the frame size may be reduced. The end-to-end delay may be determined from encoder buffer output delay. In one example, end-to-end delay may be determined from one frame. The end-to-end delay may be determined from any number of frames in alternate embodiments. For other applications, end-to-end delay may be determined from the starting output stream when the buffer is half full.

The decoder buffer delay may be computed as well. When a frame is scheduled to be removed, all bits of the frame shall be in the decoder buffer. For some applications, decoder buffer delay depends on the maximum number of bits for a frame. For other applications, the decoder buffer delay may be determined when the buffer is half full.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Moreover, the software is preferably implemented as an application program tangibly embodied on a non-transitory program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure.

For example, alternate embodiments may encode an exact average bit-rate when sequence length or capacity are known, implement pyramid vector quantization after using two complete two-pass encoding, optimize bit assignment inside of a frame, recognize a scene change, utilize a statistical multiplexer, and/or implement stream selection for layered data. All such changes and modifications are intended to be included within the scope of the present disclosure as set forth in the appended claims.

APPENDIX I

TABLE A $$S(N, K) = \left\{ \frac{y}{\|y\|}, y \in \left\{ \mathbb{Z}^N : \sum_{i=0}^{N-1} |y_i| = K \right\} \right\} \quad \text{<Equation 1>}$$

$$g = Q\_g \, \text{gamma}^{1+2a} \quad \text{<Equation 2>}$$

$$x = \frac{x\_d}{\|x\_d\|} \quad \text{<Equation 3>}$$

$$m = \text{argmax\_i } |r\_i| \quad \text{<Equation 4>}$$
$$s = \text{sign}(r\_m)$$
$$v = r + s \, e\_m \quad \text{<Equation 5>}$$

$$z = x - 2 \frac{v^{\wedge}T \, x}{v^{\wedge}T \, v} v \quad \text{<Equation 6>}$$

$$\text{theta} = \arccos(-s \, z\_m) \quad \text{<Equation 7>}$$
$$z = -s \cos(\text{theta}) \, e\_m + \sin(\text{theta}) \, z\_r \quad \text{<Equation 8>}$$
$$\text{sum\_i}(|y[i]|) = K \quad \text{<Equation 9>}$$

$$z\_rq = \frac{y}{\|y\|} \quad \text{<Equation 10>}$$

$$Q\_\text{theta} = \frac{dg}{d(\text{gamma})} * \frac{1}{g} = \frac{1+2a}{\text{gamma}} \quad \text{<Equation 11>}$$

$$\cos(\text{tau}) = 1 - \frac{1}{K} \quad \text{<Equation 12>}$$

$$K = \frac{2}{\text{Tau}} \quad \text{<Equation 13>}$$

$$\cos(\text{tau}) = 1 - \frac{N}{K^2} \quad \text{<Equation 14>}$$

$$K = \frac{\sqrt{2 \, N'}}{\text{tau}} \quad \text{<Equation 15>}$$

$$K = \min\left( \frac{\sqrt{2 \, N'}}{\text{tau}}, \frac{2}{\text{tau}^2} \right) \quad \text{<Equation 16>}$$

$$\text{tau} = \frac{Q\_\text{theta}}{\sin(\text{theta})} \quad \text{<Equation 17>}$$

$$f(\text{theta}) = a1 \, \text{theta} - a2 \, \text{theta}^2 \quad \text{<Equation 18>}$$
$$K = \min(c1 \, \text{gamma} \, \sqrt{N'}, c2 \, \text{gamma}^{\wedge}2) \quad \text{<Equation 19>}$$

What is claimed is:

1. A method of adapting pyramid vector quantization for use in encoding video data, the method comprising:
   receiving the video data in a frequency domain, the video data comprising an input frequency band;
   computing a predicted reference in response to receiving the input frequency band;
   computing a reflection plane responsive to the input frequency band and predicted response;
   applying the reflection to both the input frequency band and predicted response;
   computing an angle between the input frequency band and predicted reference, the angle being based on the reflected input frequency band and the reflected predicted reference; and
   pyramid vector quantizing at least one group of pictures (GOP) from the received video data based on the computed angle and available bandwidth, the GOP comprising key frames and a number of predicted frames, the quantizing including quantizing the computed angle, the number of predicted frames in the GOP depending on the available bandwidth.

2. The method of claim 1, further comprising:
   coding the quantized angle.

3. The method of claim 1, further comprising:
   splitting the received frequency-domain video data into at least two frequency bands; and
   quantizing an upper frequency band more coarsely than a lower frequency band.

4. An apparatus for adapting pyramid vector quantization for use in encoding video data, the apparatus comprising:
   a processor; and
   one or more stored sequences of instructions which, when executed by the processor, cause the processor to:
   receive the video data in a frequency domain, the video data comprising an input frequency band;
   compute a predicted reference in response to receiving the input frequency band;
   compute a reflection plane responsive to the input frequency band and predicted response;
   apply the reflection to both the input frequency band and predicted response;
   compute an angle between the input frequency band and predicted reference, the angle being based on the reflected input frequency band and the reflected predicted reference; and
   pyramid vector quantize at least one group of pictures (GOP) from the received video data based on the computed angle and available bandwidth, the GOP comprising key frames and a number of predicted frames, the quantizing including quantizing the computed angle, the number of predicted frames in the GOP depending on the available bandwidth.

5. The apparatus of claim 4, wherein the one or more stored sequences of instructions further cause the processor to:
   coding the quantized angle.

6. The apparatus of claim 4, wherein the one or more stored sequences of instructions further cause the processor to:
   split the received frequency-domain video data into at least two frequency bands; and
   quantize an upper frequency band more coarsely than a lower frequency band.

7. A computer program product, comprising a non-transitory computer-readable medium having a computer-readable program code embodied therein to be executed by one or more processors, the program code including instructions to:
   receive video data in the frequency domain, the video data comprising an input frequency band;
   compute a predicted reference in response to receiving the input frequency band;
   compute a reflection plane responsive to the input frequency band and predicted response;

apply the reflection to both the input frequency band and predicted response;

compute an angle between the input frequency band and predicted reference, the angle being based on the reflected input frequency band and the reflected predicted reference; and pyramid vector quantize at least one group of pictures (GOP) from the received video data based on the computed angle and available bandwidth, the GOP comprising key frames and a number of predicted frames, the quantizing including quantizing the computed angle, the number of predicted frames in the GOP depending on the available bandwidth.

8. The computer program product of claim 7, wherein the program code includes further instructions to:

code the quantized angle.

9. The computer program product of claim 7, wherein the program code includes further instructions to:

split the received frequency-domain video data into at least two frequency bands; and quantize an upper frequency band more coarsely than a lower frequency band.

\* \* \* \* \*